United States Patent
Su et al.

(10) Patent No.: US 11,630,503 B2
(45) Date of Patent: Apr. 18, 2023

(54) METHODS FOR MULTIDROP NETWORK SYSTEM

(71) Applicant: Realtek Semiconductor Corporation, Hsinchu (TW)

(72) Inventors: Ching-Yao Su, Hsinchu (TW); Yung-Le Chang, Hsinchu (TW); Yuan-Jih Chu, Hsinchu (TW); Ming-Jhe Du, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 49 days.

(21) Appl. No.: 17/462,182

(22) Filed: Aug. 31, 2021

(65) Prior Publication Data

US 2022/0164020 A1 May 26, 2022

(30) Foreign Application Priority Data

Nov. 20, 2020 (TW) ................................ 109140876

(51) Int. Cl.
 *G06F 1/32* (2019.01)
 *G06F 1/3287* (2019.01)
 *G06F 1/3206* (2019.01)

(52) U.S. Cl.
 CPC .......... *G06F 1/3287* (2013.01); *G06F 1/3206* (2013.01)

(58) Field of Classification Search
 CPC .............................. G06F 1/3287; G06F 1/3206
 See application file for complete search history.

(56) References Cited

U.S. PATENT DOCUMENTS

| | | | |
|---|---|---|---|
| 2004/0081079 A1 | 4/2004 | Forest et al. | |
| 2004/0203976 A1* | 10/2004 | Gupta | H04W 52/0274 455/556.1 |
| 2013/0326255 A1* | 12/2013 | Kodama | H04L 12/40039 713/323 |
| 2015/0370312 A1 | 12/2015 | Desposito et al. | |

OTHER PUBLICATIONS

Philip Axer et al., "OPEN Sleep/Wake-up Specification—Sleep/Wake-up Specification for Automotive Ethernet," Open Alliance, Feb. 21, 2017, pp. 1-17.
EEE Computer Society, "147. Physical Coding Sublayer (PCS), Physical Medium Attachment (PMA) sublayer and baseband medium, type 10BASE-T1S," IEEE Standard for Ethernet—Amendment 5: Physical Layer Specifications and Management Parameters for 10 Mb/s Operation and Associated Power Delivery over a Single Balanced Pair of Conductors, IEEE Std 802.3cg clause 147, 2019, pp. 178-225.
IEEE Computer Society, "148. PLCA Reconciliation Sublayer (RS)" IEEE Standard for Ethernet—Amendment 5 Physical Layer Specifications and Management Parameters for 10 Mb/s Operation and Associated Power Delivery over a Single Balanced Pair of Conductors, IEEE Std 802.3cg clause 148, 2019, pp. 226-247.

* cited by examiner

*Primary Examiner* — Stefan Stoynov
(74) *Attorney, Agent, or Firm* — Locke Lord LLP; Tim Tingkang Xia, Esq.

(57) ABSTRACT

A method for a multidrop network system is provided. The method includes the following steps: transmitting, by a first node, a sleep request message to a second node; and determining, by the first node, whether to enter a sleep state from a wakeup state according to the condition in which the second node transmits a sleep acknowledge message in response to the sleep request message.

18 Claims, 4 Drawing Sheets

METHODS FOR MULTIDROP NETWORK SYSTEM

RELATED APPLICATIONS

This application claims priority to Taiwan Application Serial Number 109140876, filed on Nov. 20, 2020, which is herein incorporated by reference.

BACKGROUND

Field of the Invention

The disclosure relates to methods for a multidrop network system, and more particularly, to methods of sleep and wakeup procedures for a multidrop network system.

Description of Related Art

A multidrop network system is a network system in which multiple endpoints are connected to each other through transmission lines, which can be applied to the control of in-vehicle equipment. However, the conventional multidrop network system does not provide reliable sleep and wakeup functions. The sleep and wakeup procedures can be performed only in a point-to-point manner, and thus the overall performance of the multidrop network system is limited.

SUMMARY

An objective of the present disclosure is to provide methods for a multidrop network system, and the methods are capable of performing one-to-many sleep and wakeup procedures to further provide reliable sleep and wakeup functions, such that overall performance of the multidrop network system can be improved. The methods are further capable of performing partial node wakeup function, so as to achieve the efficacy of partial networking.

One aspect of the present disclosure relates to a method for multidrop network system having multiple nodes that are connected with each other. The method includes the following steps: sending, by a first node of the nodes, a sleep request message to at least one second node of the nodes; and determining whether the first node is to enter a sleep state from a wakeup state depending on a condition of transmitting a sleep acknowledgement message by the second node in response to the sleep request message.

Another aspect of the present disclosure relates to a method for multidrop network system having multiple nodes that are connected with each other. The method includes the following steps: sending, by a first node of the nodes, a wakeup request message to a second node of the nodes; and determining whether the second node is to enter a wakeup state from a sleep state depending on content in the wakeup request message.

Yet another aspect of the present disclosure relates to a method for multidrop network system having multiple nodes that are connected with each other. The method includes the following steps: configuring a first node of the nodes to actively enter a wakeup state from a sleep state and to send a node list request message; and updating, by a second node of the nodes that receives the node list request message, a node list depending on a node index of the node list request message, and sending, by the second node, a node list update message with node list information in the multidrop network system.

DETAILED DESCRIPTION

The detailed explanation of the disclosure is described as following. The described preferred embodiments are presented for purposes of illustrations and description, and they are not intended to limit the scope of the disclosure.

Terms used herein are only used to describe the specific embodiments, which are not used to limit the claims appended herewith. Unless limited otherwise, the term "a," "an," "one" or "the" of the single form may also represent the plural form.

It will be understood that, although the terms "first," "second," "third" and so on may be used herein to describe various signals and/or entities, these signals and/or entities, should not be limited by these terms. These terms are only used to distinguish signals and/or entities.

The document may repeat reference numerals and/or letters in the various examples. This repetition is for the purpose of simplicity and clarity and does not in itself dictate a relationship between the various embodiments and/or configurations discussed.

In the context, messages related to wakeup and sleep procedures, such as sleep request messages, sleep acknowledgement messages, wakeup request messages, wakeup acknowledgement messages, node list request messages and node list update messages, have a format with instruction and node index columns, in which the instruction column represents a message type, while the node index column indicates a destination node index.

Figure 1:
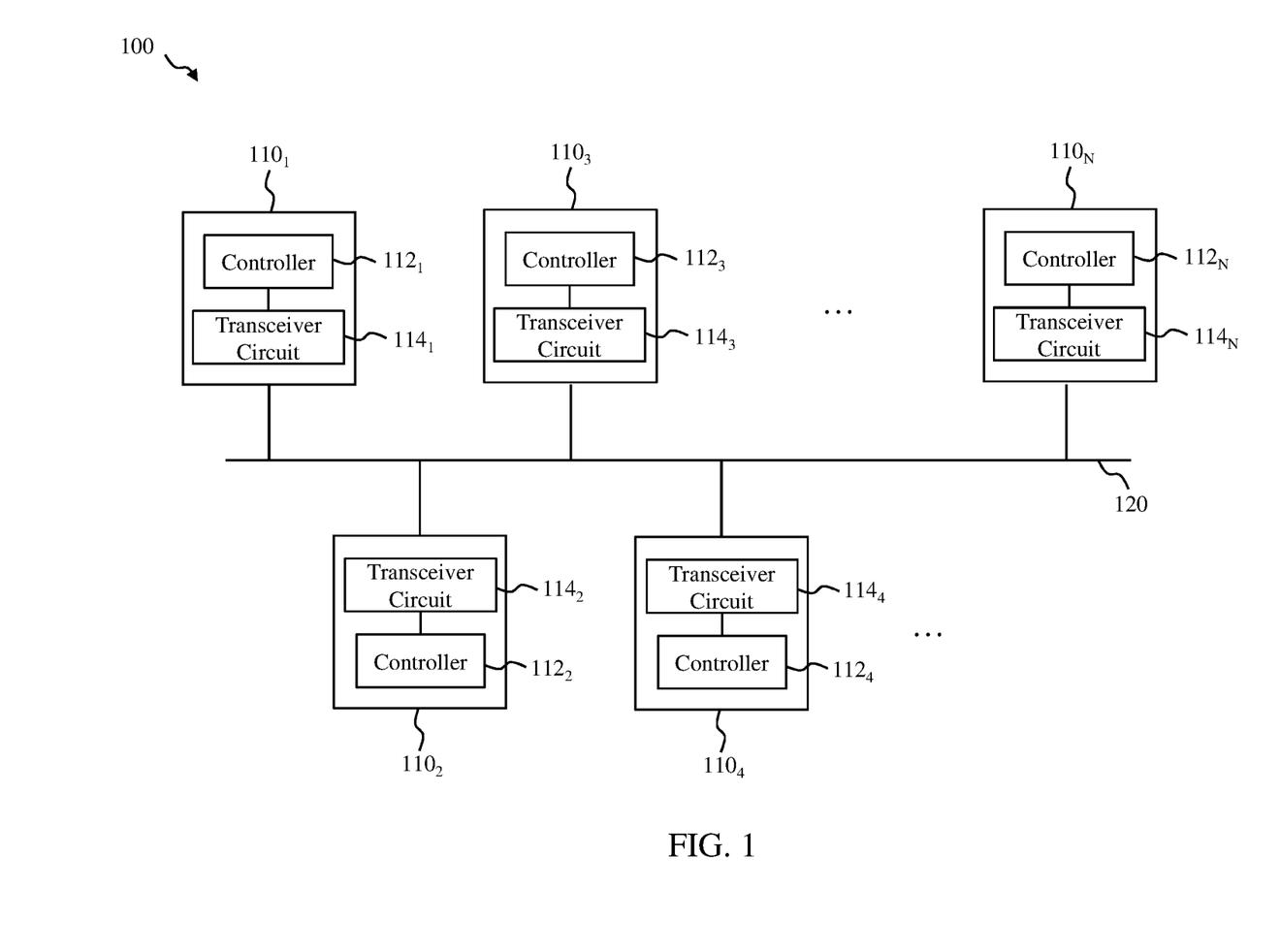
FIG. 1 is a schematic diagram of a multidrop network system in accordance with some embodiments of the disclosure.

FIG. 1 is a schematic diagram of a multidrop network system 100 in accordance with some embodiments of the disclosure. In the multidrop network system 100, nodes $110_1$-$110_N$ are communicatively connected with each other. As shown in FIG. 1, in the embodiments, the multidrop network system 100 has a bus topology, i.e., the nodes $110_1$-$110_N$ are all connected to a bus 120. In another embodiment, in the multidrop network system 100, the nodes $110_1$-$110_N$ may be connected with each other through the bus 120. The nodes $110_1$-$110_N$ respectively include control units $112_1$-$112_N$ and transceiver circuits $114_1$-$114_N$. The control units $112_1$-$112_N$ are configured to control message transmissions and receptions, and respectively control statuses of the transceiver circuits $114_1$-$114_N$. The transceiver circuits $114_1$-$114_N$ respectively have signal transception and analog/digital signal detection functions. If the multidrop network system 100 is an automotive Ethernet system, each of the control units $112_1$-$112_N$ may be, for example, an electronic control unit (ECU), a hybrid control unit (HCU), a processor, a microprocessor or a microcontroller, but the present disclosure is not limited thereto. In addition, the multidrop network system 100 may support specifications such as 10BASE-T1, 10BASE-T1S, Controller Area Network (CAN) and/or Power over Data Lines (PoDL), and each of the nodes $110_1$-$110_N$ may be a device supporting the Sleep/Wake-up Specification of the OPEN Alliance.

If the node $110_n$ among the nodes $110_1$-$110_N$ is a switch or an electronic device with a switch function, the interfaces of the node $110_n$ for receiving and forwarding messages may be different connection ports. That is, the node $110_n$ receives messages through one of the connection ports and forward messages through another one of the connection ports. In addition, the multidrop network system 100 may be communicatively connected with another network system through one or more of the nodes $110_1$-$110_N$.

Figure 2:
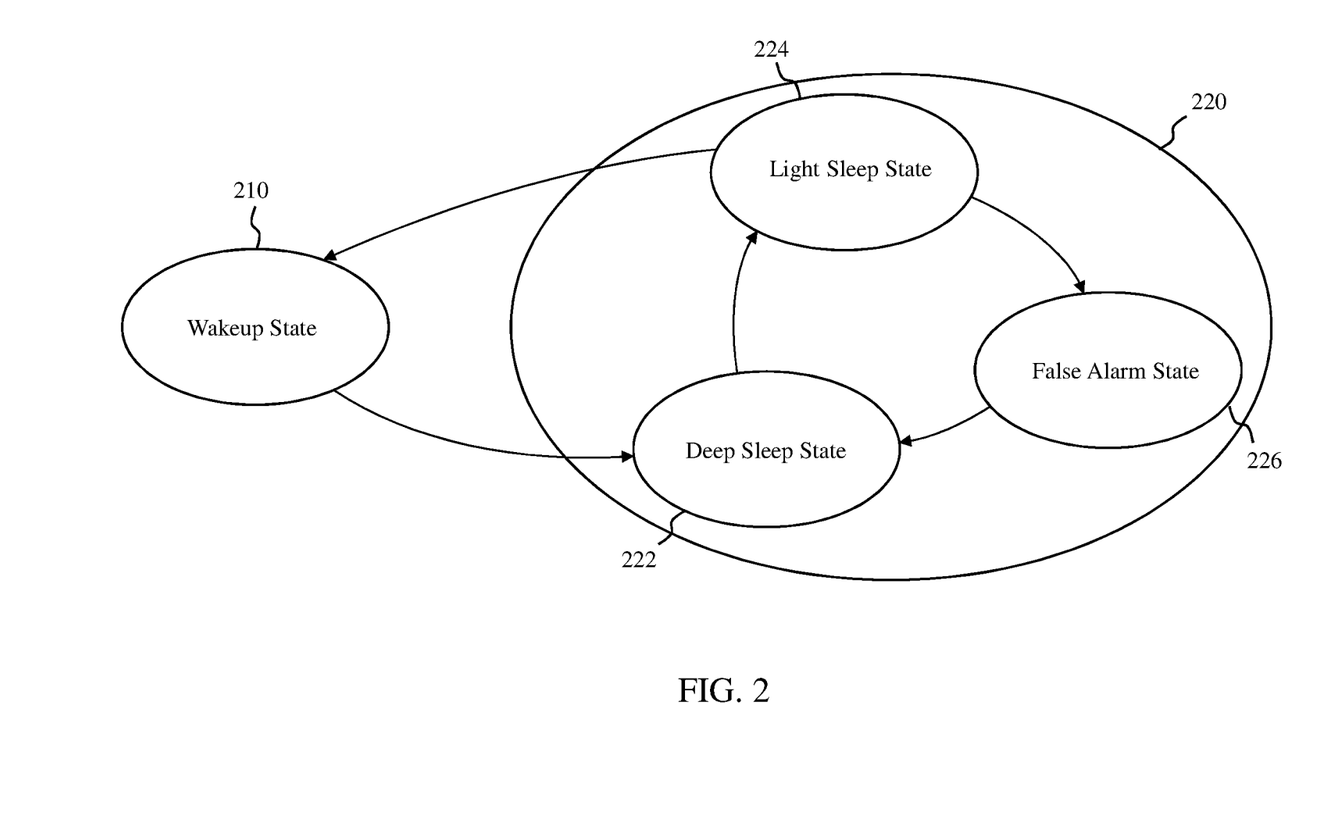
FIG. 2 is a state transition diagram of any node in the multidrop network system in FIG. 1.

FIG. 2 is a state transition diagram of any node in the multidrop network system 100. The state transition diagram shown in FIG. 2 includes a wakeup state 210 and a sleep state 220. Taking the node $110_i$ as an example, in the wakeup state 210, the node $110_i$ may operate normally (including normal message transmissions), while in the sleep state 220, the node $110_i$ is restricted to perform only some operations for power saving.

Furthermore, the sleep state 220 may be classified into a deep sleep state 222, a light sleep state 224 and a false alarm state 226. Taking the node $110_i$ for example, in the deep sleep state 222, the node $110_i$ only activates an analog signal detection function but deactivates other functions (such as a digital signal detection function), in order to minimize power consumption. In the light sleep state 224, the node $110_i$ activates a digital signal detection function and determines whether the received message is a wakeup request message. In the false alarm state 226, the node $110_i$ deactivates the digital signal detection function and monitors when the signal transmission channel is silent.

When the node $110_i$ detects a received message, the node $110_i$ enters the light sleep state 224 from the deep sleep state 222 to activate a digital signal detection function, and then the node $110_i$ determines whether the received message is a wakeup request message. If it is determined that the received message is a wakeup request message of which the wakeup node index is identical to the node index of the node $110_i$ or is a global index, the node $110_i$ transits from the light sleep state 224 to the wakeup state 210 for normal operations. If the node $110_i$ determines that the received message is not a wakeup request message, or the node $110_i$ determines that the received message is a wakeup request message but that the wakeup node index thereof is different from the node index of the node $110_i$ or the node $110_i$ determines that the received index is not a global index, the node $110_i$ enters the false alarm state 226 from the light sleep state 224 to stop the digital signal detection function, and then enters from the false alarm state 226 to the deep sleep state 222 when the node $110_i$ detects that the signal transceiving channel is silent. As such, the node $110_i$ can be at the minimum power consumption mode for a majority of the time.

Figure 3:
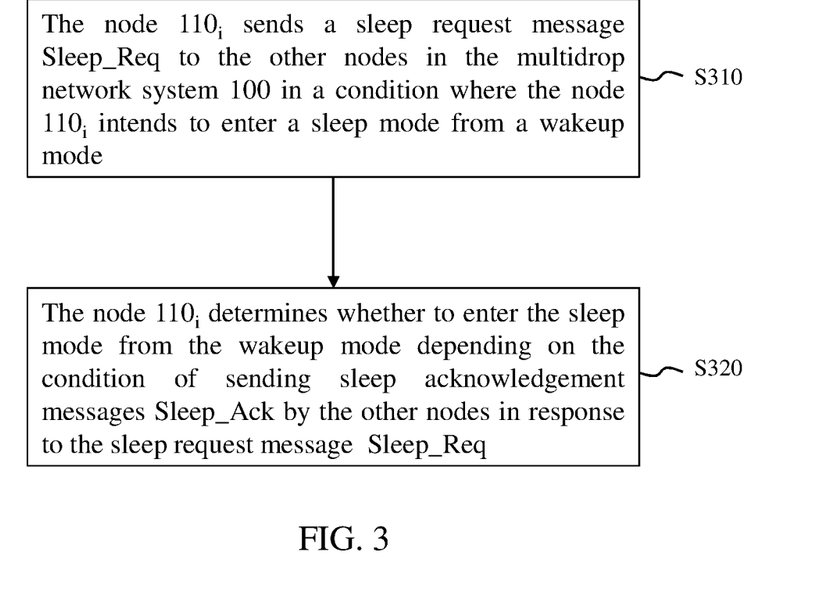
FIG. 3 is a flowchart of a method for the multidrop network system in FIG. 1 in accordance with some embodiments of the disclosure.

FIG. 3 is a flowchart of a method 300 for the multidrop network system 100 in accordance with some embodiments of the disclosure. In the beginning, in Step S310, a node $110_i$ among the nodes $110_1$-$110_N$ sends a sleep request message Sleep_Req to the other nodes (i.e., the nodes $110_1$-$110_{(i-1)}$, $110_{(i+1)}$-$110_N$) in the multidrop network system 100. In some embodiments, the node $110_i$ sends the sleep request message Sleep_Req in a condition where the node $110_i$ intends to enter a sleep state from a wakeup state (the node $110_i$ is the node that actively triggers a sleep procedure at this time). The node $110_i$ may send the sleep request message Sleep_Req by broadcasting.

Then, in Step S320, the node $110_i$ determines whether to enter the sleep state from the wakeup state depending on the condition of sending sleep acknowledgement messages Sleep_Ack. In some embodiments, the sleep acknowledgement messages Sleep_Ack are sent by the other nodes in response to the sleep request message Sleep_Req. In normal conditions, each non-sleep node other than the node $110_i$ sends the sleep acknowledgement message Sleep_Ack to the node $110_i$ in response to the sleep request message Sleep_Req, after each non-sleep node other than the node $110_i$ receives the sleep request message Sleep_Req from the node $110_i$. Therefore, the node $110_i$ may determine that the non-sleep nodes among the other nodes have all received the sleep request message Sleep_Req if the number of sleep acknowledgement messages Sleep_Ack received by the node $110_i$ is identical to the number of wakeup node indices. In some embodiments, the wakeup node indices in a node list are stored in the node $110_i$. The node $110_i$ may also update the node list thereof in response to the received sleep acknowledgement message Sleep_Ack by updating the state information thereof from "wakeup" to "sleep", and the node $110_i$ may establish a flag. When the control unit $112_i$ reads the flag established by the node $110_i$, the control unit $112_i$ controls the transceiver circuit $114_i$ to send the updated node list to all wakeup nodes in the multidrop network system 100, and then the node $110_i$ enters the sleep state from the wakeup state.

The step of determining whether the node $110_i$ enters the sleep state is determining whether the number of sleep acknowledgement messages Sleep_Ack received in a predetermined period of time after the node $110_i$ sends the sleep request messages Sleep_Req is identical to the number of wakeup node indices in the node list of the node $110_i$.

The node $110_i$ may start a timer at the same time as sending the sleep request message Sleep_Req. If the node $110_i$ receives the sleep acknowledgement messages Sleep_Ack sent by all nodes in the wakeup state before the timer is timeout, the node $110_i$ stops the timer and enters from the wakeup state into the sleep state. On the contrary, if not receiving all the sleep acknowledgement messages Sleep_Ack sent by all nodes, the node $110_i$ retransmits the sleep request message Sleep_Req and restarts the timer. If the number of retransmitted sleep request messages Sleep_Req reaches the predetermined maximum sleep request message retransmission times, and the node $110_i$ does not receive all the sleep acknowledgement messages Sleep_Ack from the wakeup nodes when the timer is timeout, the node $110_i$ leaves the sleep procedure and keeps in the wakeup state rather than entering the sleep state.

Figure 4:
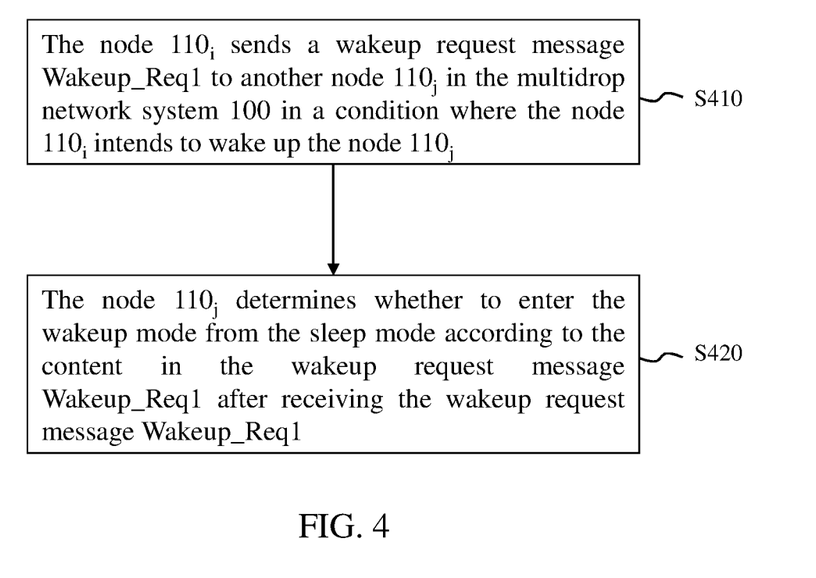
FIG. 4 is a flowchart of a method for the multidrop network system in FIG. 1 in accordance with some embodiments of the disclosure.

FIG. 4 is a flowchart of a method 400 for the multidrop network system 100 in accordance with some embodiments of the disclosure. In the beginning, in Step S410, the node $110_i$ sends a wakeup request message Wakeup_Req1 to another node $110_j$ in the multidrop network system 100 in a condition where the node $110_i$ intends to wake up the node $110_j$. According to various wakeup scenarios, the wakeup request message Wakeup_Req1 may be a global wakeup request message or a selective wakeup request message. In other words, the wakeup node index in the wakeup request message Wakeup_Req1 may be a global index, or may correspond to a specific node. For example, a node in the multidrop network system 100 may send a global wakeup request message to wake up all the other nodes in the multidrop network system 100, or may send a selective wakeup request message with a particular wakeup node index to wake up another one or some other nodes in the multidrop network system 100.

The node $110_i$ may send the wakeup request message Wakeup_Req1 at one time or continuously depending on system configurations, hardware performances and/or another condition. In some embodiments, the node $110_i$ continuously sends the wakeup request message Wakeup_Req1 by a predetermined number of times. The node $110_j$ would be in the deep sleep state and consume some time from analog signal detection to message verification after the node $110_j$ enters the light sleep state. In a case where a hardware function of the node $110_j$ is limited, the node $110_i$ may continuously send the wakeup request message Wakeup_Req1 to the node $110_j$ by a predetermined number of times within a time period, so as to assure that the wakeup request message Wakeup_Req1 is received and processed by the node $110_j$.

Subsequently, in Step S420, after node $110_j$ receives the wakeup request message Wakeup_Req1, the node $110_j$ determines whether to enter the wakeup state from the sleep state depending on content in the wakeup request message Wakeup_Req1. If the node $110_j$ determines that the wakeup node index of the wakeup request message Wakeup_Req1 is identical to its node index, or if the node $110_j$ determines that the wakeup node index of the wakeup request message Wakeup_Req1 is a global index, the node $110_j$ enters the wakeup state from the sleep state, and sends a wakeup acknowledgement message Wakeup_Ack1 to the node $110_i$ in response to the wakeup request message Wakeup_Req1. When the node $110_i$ receives the wakeup acknowledgement message Wakeup_Ack1 from the node $110_j$, the node $110_i$ updates the node list thereof in which the information corresponding to the node $110_j$ is updated from "sleep" to "wakeup". The node $110_i$ controls the transceiver circuit $114_i$ to send a node list to all wakeup nodes in the multidrop network system after the node list of the node $110_i$ is updated and then an established flag is read by the control unit $112_i$. Because none of the nodes other than the node $110_i$ is a node that actively triggers the wakeup procedure, the wakeup nodes other than the node $110_i$ respectively update the node lists thereof according to the node list data from the node $110_i$. If a flag is established before any of the wakeup nodes other than the node $110_i$ receives the node list data from the node $110_i$, the established flag is deleted by the wakeup node.

The node $110_i$ may activate a timer at the same time as sending the wakeup request message Wakeup_Req1. The node $110_i$ deactivates the timer if the node $110_i$ receives a wakeup acknowledgement message Wakeup_Ack1 before the timer is timeout. On the contrary, if the node $110_i$ still does not receive a wakeup acknowledgement message Wakeup_Ack1 before the timer is timeout, the node $110_i$ retransmits the wakeup request message Wakeup_Req1 to the node $110_j$, and restarts the timer. If the retransmission count of the wakeup request message Wakeup_Req1 reaches a predetermined retransmission number of times, and if the node $110_j$ still does not receive the wakeup acknowledgement message Wakeup_Ack1 after the timer is timeout, the node $110_j$ could not be waken up for a reason, or alternatively the node $110_j$ is possibly separated from the multidrop network system 100. In such condition, the node $110_i$ does not update the state of the node $110_j$ in the node list.

In some embodiments, if the node $110_k$, other than the nodes $110_i$ and $110_j$, in the multidrop network system 100 detects the wakeup acknowledgement message Wakeup_Ack1 sent from the node $110_j$, then the node $110_k$ may update the node list thereof according to the wakeup acknowledgement message Wakeup_Ack1, and updates the information corresponding to the node $110_j$ from "sleep" to "wakeup". As such, the node $110_k$ can acknowledge that the node $110_j$ has already entered the wakeup state before waiting the node $110_i$ to send update node list information, and can further start transmitting information to the node $110_j$ in advance.

In some embodiments, the node $110_i$ sends node list data to all wakeup nodes in the multidrop network system 100 other than the node $110_j$, and the wakeup nodes in the multidrop network system 100 other than the node $110_j$ update the node lists thereof accordingly.

A condition of receiving a wakeup request message by a wakeup node in the multidrop network system 100 may happen due to an exception such as triggering a wakeup procedure by this wakeup node, losing of the wakeup acknowledgement message sent from this wakeup node, or another exception. In some embodiments, the node $110_j$ determines whether the wakeup node index of the wakeup request message Wakeup_Req2 is identical to the node index thereof if the node $110_j$ receives the wakeup request message Wakeup_Req2 from the node $110_k$ after the node $110_j$ enters the wakeup state from the sleep state. If the wakeup node index of the wakeup request message Wakeup_Req2 is identical to the node index of the node $110_j$, the node $110_j$ sends the wakeup acknowledgement message Wakeup_Ack2 to the node $110_k$ in response to the wakeup request message Wakeup_Req2, so as to notify that the node $110_j$ is already in the wakeup state.

In another embodiment, multiple nodes of the same multidrop network system 100 may be woken up by a single node. For example, the node $110_i$ sends the wakeup request message Wakeup_Req1 to the nodes $110_j$, $110_k$ and activates a timer if the node $110_i$ intends to wake up the nodes $110_j$, $110_k$. If the node $110_i$ receives wakeup acknowledgement messages Wakeup_Ack1 respectively from the nodes $110_j$, $110_k$ before the timer is timeout, the node $110_i$ stops the timer, updates the node list thereof in which the information corresponding to the nodes $110_j$, $110_k$ is updated from "sleep" to "wakeup", and then establishes a flag. On the contrary, if the node $110_i$ does not receive the wakeup acknowledgement messages Wakeup_Ack1 respectively from the nodes $110_j$, $110_k$ when the timer is timeout, the node $110_i$ retransmits the wakeup request message Wakeup_Req1 to the node that corresponds to the unreceived wakeup acknowledgement message Wakeup_Ack1, and reactivates the timer. If the retransmission number of times of the wakeup request message Wakeup_Req1 reaches a predetermined retransmission number of times, and if the wakeup acknowledgement messages Wakeup_Ack1 respectively from the nodes $110_j$, $110_k$ have not been all received by the node $110_i$ when the timer is timeout, the node $110_i$ does not update the state information of the node, in the node list thereof, from which the wakeup acknowledgement message Wakeup_Ack1 is not received.

In some applications, the node $110_n$ among the nodes $110_1$-$110_N$ is a switch with a first connection port and a second connection port. The first connection port connects the other nodes in the multidrop network system 100, while the second connection port is connected with another network system (including but not limited to a multidrop network system). In such case, after a wakeup request message is received via the first connection port, the node $110_n$ may forward the wakeup request message to another network system via the second connection port, so as to wake up one or more nodes in another network system.

Figure 5:
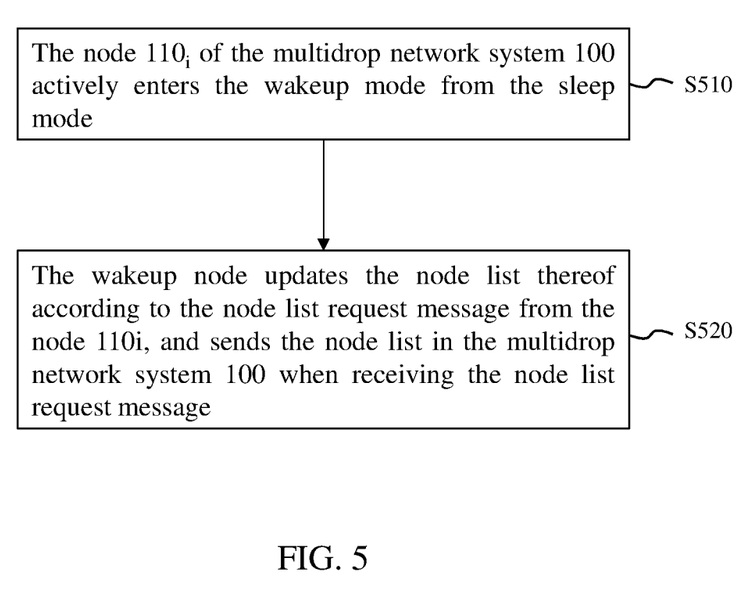
FIG. 5 is a flowchart of a method for the multidrop network system in FIG. 1 in accordance with some embodiments of the disclosure.

FIG. 5 is a flowchart of a method 500 for the multidrop network system 100 in accordance with some embodiments of the disclosure. In the beginning, in Step S510, the node $110_i$ of the multidrop network system 100 performs a local wakeup operation to actively enter a wakeup state from a sleep state and then send a node list request message to all wakeup nodes in the multidrop network system 100 other than the node $110_i$. Then, in Step S520, when the wakeup node receives the node list request message, the wakeup node updates the node list thereof according to the node list request message from the node $110_i$, and sends the node list in the multidrop network system 100.

For example, when the node $110_j$ of the multidrop network system 100 receives a node list request message from the node $110_i$, the node $110_j$ updates the node list thereof by updating the state information of the node $110_i$ from "sleep" to "wakeup" when the node $110_j$ receives a node list request message from the node $110_i$. Then, the node $110_j$ establishes a flag, and the control unit $112_j$ controls the transceiver circuit $114_j$ to send the updated node list in the multidrop network system 100 when the control unit $112_j$ detects the flag. Then, the control unit $112_j$ deletes the flag after the updated node list is completely sent. After the wakeup nodes other than the node $110_j$ receive a node list update message from the node $110_j$, the wakeup nodes other than the node $110_j$ respectively update the node lists thereof according to the node list information in the node list update message. If any wakeup node other than the node $110_j$ has established a flag before receiving a node list update message from the node $110_j$, it is further determined whether the wakeup node is a node that actively triggers a wakeup procedure or a sleep procedure. If the wakeup node is a node that actively triggers a wakeup procedure or a sleep procedure, the wakeup node keeps the established flag after the wakeup node receives the node list update message from the node $110_j$. Otherwise, if the wakeup node is not a node that actively triggers a wakeup procedure or a sleep procedure, the wakeup node deletes the established flag after the wakeup node receives the node list update message from the node $110_j$. In some embodiments, the node $110_j$ further sends a node list update message with node list information to all wakeup nodes in the multidrop network system 100 other than the node $110_j$ corresponding to the node list thereof, such that the wakeup nodes in the multidrop network system 100 other than the node $110_j$ update the node lists thereof by updating the information corresponding to the node $110_i$ from "sleep" to "wakeup". As such, the time for these nodes to start transmitting data to the node $110_i$ can further be advanced.

In some embodiments, if the node $110_i$ receives a wakeup request message Wakeup_Req from the node $110_k$ after the node $110_i$ enters the wakeup state from the sleep state, the node $110_i$ determines whether the node index thereof is identical to the wakeup node index in the wakeup request message Wakeup_Req. If the node index of the node $110_i$ is identical to the wakeup node index in the wakeup request message Wakeup_Req, the node $110_i$ sends the wakeup acknowledgement message Wakeup_Ack to the node $110_k$ in response to the wakeup request message Wakeup_Req, in order to notify that the node $110_i$ is already in the wakeup state.

In some embodiments, if the node $110_l$ other than the nodes $110_i$, $110_k$ in the multidrop network system 100 detects the wakeup acknowledgement message Wakeup_Ack sent from the node $110_i$, the node $110_l$ may update the node list thereof according to the wakeup acknowledgement message Wakeup_Ack, in which the information corresponding to the node $110_i$ is updated from "sleep" to "wakeup". As such; the time for the node $110_l$ to start transmitting data to the node $110_i$ can further be advanced.

In addition, in the embodiments of the disclosure, each wakeup node may be set as an initial node and send a roll call request message at a particular time or periodically, and each of the other wakeup nodes in the same multidrop network system also sends a roll call request message to the initial node in response to the roll call request message from the initial node. In some embodiments, the other wakeup nodes in the same multidrop network system only response to the roll call request message after the other wakeup nodes receives the roll call request message from the initial node. The roll call request message includes a global index and a sender node index. Alternatively, the roll call request message may only include a sender node index. If any wakeup node detects the roll call request message, and if sender information corresponding to the roll call request message in the node list of the wakeup node is a sleep node, the wakeup node updates the sender information from "sleep" to "wakeup". In some embodiments, if any wakeup node detects the roll call request message, and if the sender information corresponding to the roll call request message in the node list of the wakeup node is "sleep", the wakeup node updates the sender information from "sleep" to "wakeup", and then sends the updated node list in the multidrop network system. In some embodiments, the initial node sends a new node list if the node list in response to the roll call request and received in a period of time is inconsistent with the node list of the initial node. The aforementioned method of sending a roll call request message at a particular time or periodically can assure that the node lists of the wakeup nodes are consistent.

For example, if the wakeup node $110_i$ in the multidrop network system 100 is set as an initial sending node for transmitting the roll call request message to the wakeup nodes $110_j$ and $110_k$, the nodes $110_j$ and $110_k$ respectively send roll call request messages to the node $110_i$ after the nodes $110_j$ and $110_k$ receive the roll call request message from the node $110_i$. If the node $110_i$ does not receive a roll call request message from the node $110_k$ after the node $110_i$ sends a roll call request message in a period of time (e.g. 100 milliseconds), then the node $110_i$ retransmits the roll call request message to the node $110_k$. If the node $110_i$ still does not receive a roll call request message from the node $110_k$ when the number of retransmissions reaches a maximum value, the node $110_i$ determines that the node $110_k$ is not in the wakeup state. After the node $110_i$ determines that the node $110_k$ is not in the wakeup state, the node $110_i$ updates the node list thereof by updating the information corresponding to the node $110_i$ from "wakeup" to "sleep", and sends the updated node list in the multidrop network system 100. Further, if the node $110_j$ detects the wakeup acknowledgement message which is sent from the node $110_k$, and if the information corresponding to the node $110_k$ in the node list of the node $110_j$ is sleep, the node $110_j$ updates the node list thereof by updating the information corresponding to the node $110_k$ from "sleep" to "wakeup".

Based on at least the above embodiments, the methods for a multidrop network system according to the disclosure are capable providing reliable sleep and wakeup functions, such that the overall performance of the multidrop network system can be improved. The methods are further capable of performing partial node wakeup function, so as to achieve the efficacy of partial networking.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims.

What is claimed is:

1. A method for multidrop network system having a plurality of nodes that are connected with each other, the method comprising:
   sending, by a first node of the plurality of nodes, a sleep request message to at least one second node of the nodes; and
   determining whether the first node is to enter a sleep state from a wakeup state depending on a condition of transmitting a sleep acknowledgement message by the at least one second node in response to the sleep request message;
   wherein the first node enters the sleep state from the wakeup state if receiving the sleep acknowledgement message of the at least one second node in a predetermined period of time after the sleep request message is sent;
   wherein the first node keeps in the wakeup state if not receiving the sleep acknowledgement message of the at least one second node in the predetermined period of time after the sleep request message is sent.

2. The method of claim 1, wherein the sleep request message is sent by broadcasting, and determining whether the first node is to enter the sleep state is determining whether the number of sleep acknowledgement messages received by the first node in a predetermined period of time is equal to the number of wakeup node indices in a node list stored in the first node after the first node sends the sleep request message.

3. The method of claim 2, wherein the first node updates and then sends the node list by broadcasting if the number of sleep acknowledgement messages received by the first node in the predetermined period of time is equal to the number of wakeup node indices in the node list stored in the first node after the first node sends the sleep request message.

4. The method of claim 1, wherein the first node only activates an analog signal detection function after entering the sleep state.

5. A method for multidrop network system having a plurality of nodes that are connected with each other, the method comprising:
   sending, by a first node of the nodes, a first wakeup request message to a second node of the nodes; and
   determining whether the second node is to enter a wakeup state from a sleep state depending on content in the first wakeup request message;
   wherein the second node enters the wakeup state from the sleep state and sends a first wakeup acknowledgement message to the first node in response to the first wakeup request message if the second node determines that a wakeup node index of the first wakeup request message is the same as a node index of the second node or is a global index.

6. The method of claim 5, wherein the first node updates a node list depending on the first wakeup acknowledgement message after receiving the first wakeup acknowledgement message.

7. The method of claim 6 further comprising:
   sending, by the first node, node list data to the second node corresponding to the node list.

8. The method of claim 7, wherein the first node further sends the node list data to all of the nodes in the wakeup state except the second node.

9. The method of claim 5, wherein a third node of the nodes updates a node list depending on the first wakeup acknowledgement message after detecting the first wakeup acknowledgement message.

10. The method of claim 5, wherein the first wakeup request message is repeatedly and continuously sent by a predetermined number of times.

11. The method of claim 5, wherein after the second node enters the wakeup state from the sleep state, the second node determines whether a wakeup node index of a second wakeup request message is the same as a node index of the second node after receiving the second wakeup request message sent by a third node of the nodes, and the second node sends a second wakeup acknowledgement message to the third node in response to the second wakeup request message if the second node determines that the wakeup node index of the second wakeup request message is the same as the node index of the second node.

12. The method of claim 5, wherein the multidrop network system further comprises a switch with a first connection port and a second connection port, in which the first connection port is connected to the nodes of the multidrop network system, the second connection port is connected to another network system, and the switch forwards a second wakeup request message to the another network system through the second connection port after receiving the second wakeup request message through the first connection port, thereby waking up at least one node in the another network system.

13. A method for multidrop network system having a plurality of nodes that are connected with each other, the method comprising:
   configuring a first node of the nodes to actively enter a wakeup state from a sleep state and then to send a node list request message; and
   updating, by a second node of the nodes that receives the node list request message, a node list depending on a node index of the node list request message, and sending a node list update message with node list information in the multidrop network system.

14. The method of claim 13, wherein the second node sends the node list update message to all of the nodes in the wakeup state except the first node.

15. The method of claim 13 further comprising:
   establishing a flag when the second node sends the node list update message to the first node; and
   deleting the flag after the second node completes sending the node list update message.

16. The method of claim 13, wherein after the first node enters the wakeup state from the sleep state, the first node determines whether a wakeup node index of a wakeup request message sent from a second node of the nodes is the same as a node index of the first node after receiving the wakeup request message, and
   wherein the first node sends a wakeup acknowledgement message to the second node in response to the wakeup request message if the wakeup node index of the wakeup request message sent from the second node of the nodes is the same as the node index of the first node.

17. The method of claim 16, wherein a third node of the nodes updates a node list depending on the wakeup acknowledgement message after detecting the wakeup acknowledgement message.

18. The method of claim 13, further comprising:
   determining whether a third node of the nodes actively triggers a wakeup procedure or a sleep procedure if a flag is already established before the third node detects the node list update message;

keeping the flag if the third node of the nodes actively triggers a wakeup procedure or a sleep procedure; and removing the flag if the third node of the nodes does not actively trigger a wakeup procedure or a sleep procedure.

* * * * *